(12) United States Patent
Carballo

(10) Patent No.: US 7,353,154 B2
(45) Date of Patent: Apr. 1, 2008

(54) CUSTOMER CONTROLLED DESIGN OF A COMMUNICATION SYSTEM

(75) Inventor: Juan-Antonio Carballo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 10/698,138

(22) Filed: Oct. 30, 2003

(65) Prior Publication Data

US 2005/0138492 A1     Jun. 23, 2005

(51) Int. Cl.
*G06F 17/60* (2006.01)
(52) U.S. Cl. ...................................... 703/13
(58) Field of Classification Search ............... 714/704; 703/13
See application file for complete search history.

(56) References Cited

U.S. PATENT DOCUMENTS 6,973,600 B2 * 12/2005 Lau et al. .................. 714/704
7,093,172 B2 * 8/2006 Fan et al. .................. 714/716

OTHER PUBLICATIONS

Andrea Jo Goldsmith, 1994, teaches a Design and Performance of high speddcommunication systems over time varying radio channels; pp. 1-196).*
J.L. Eisenbies (Conventional for Digital data communication link design, IBM Systems Journal 1967).*
Rallapalli et al. (Emulation of a Space Based Internet Communication Link: Design and Implementation, Sep. 2002).*
Wei-Hung Chen; Dehng, G.; Jong-Woei Chen; Shen-Luan Liu; "A CMOS 400-Mb/s serial link for AS-memory systems using a PWM scheme", IEEE Journal of Solid-State Circuits, vol. 35 Issue: 10, Oct. 2001, pp. 1498-1505.
Ken Yang Chih-Kong; Ramin Farjad-Rad; M.A. Horowitz; "A 0.5-/spl mu/m CMOS 4.0-Bgit/s serial link transceiverwith data recovery using oversampling", IEEE Journal of Solid-State Circuits, vol. 3, Issue: 5, May 1998, pp. 713-722.
Khoury, J.M.; Lakshmikumar, K.R.; "High speed serial transceivers for data communication systems", IEEE Communications Magazine, vol. 39, Issue: 7, Jul. 2001, pp. 160-165.
J. Kim and M. Horowitz; "Adaptive Supply Serial Links with Sub-1V Operation and Per-Pin Clock Recovery", ISSCC 2002.

* cited by examiner

*Primary Examiner*—Paul Rodriguez
*Assistant Examiner*—Andre Pierre-Louis
(74) *Attorney, Agent, or Firm*—Casimer K. Salys; Dillon & Yudell LLP

(57) ABSTRACT

A system for designing a communication link for use in a data processing system, includes a parameter generator and an internal link model. The parameter generator allows a user to specify a first set of link parameters. The generator derives a set of internal parameters from the first set of parameters. The internal link model, which includes a set of configurable link cells, receives the internal parameters and instantiates each link cell based on the internal parameters. The system further includes a channel simulator or similar means for modeling a bit error rate (BER) of the instantiated communication link and may further include an estimator of the link's area and power consumption. In an embodiment that protects the intellectual property associated with the internal model from the system user, the parameter generator prevents the user from directly accessing the internal parameters and the generic link model.

4 Claims, 4 Drawing Sheets

CUSTOMER CONTROLLED DESIGN OF A COMMUNICATION SYSTEM

BACKGROUND

1. Field of the Present Invention

The present invention is in the field of electronic systems and more particularly in the field of the design of high speed communication links in an electronic system.

2. History of Related Art

An integrated communication link refers to the hardware system interface between two components and is composed of integrated transmitter and receiver circuits directly connected to a communication channel. Each of the components can be a general purpose processor, a memory, an application specific integrated circuit (ASIC), or another electronic device. A communication channel refers to the physical medium connecting a pair of components. Integrated communication links are found on an increasing number of integrated circuits. System-on-a-chip devices, for example, now frequently incorporate an on-board communication link enabling the device to communicate with system memory and other devices. Because of a growing number of high speed communication standards and applications, however, it is generally difficult to predict the exact application and environment in which such components will be used. Designing to a generalized specification, such as a "bathtub curve" type of specification indicating a projected bit error rate (BER) as a function of the sampling point or jitter margin, is generally insufficient to guarantee an acceptable BER in any particular implementation.

The difficulty of predicting customer's channels and applications is made worse by the reluctance of many customers to reveal the details of their system. Simultaneously, providers of communication chip solutions for such customers are equally reluctant to disclose the internal details of their communication links. Fortunately, customers, who have detailed knowledge of the particular application for a communication link, are not concerned so much with the internal design of a communication link as much as they are concerned with the link's performance characteristics within the customer's specific environment. Customers view the communication link as a black box that sits in the middle of their application. The link provider, on the other hand, is focused on the details of the link itself, and views the particular application as interesting only to the extent that it determines the limits of the link's performance. It would be desirable to implement a tool that recognized these distinct views of the communication link by enabling the customer to evaluate and optimize a communication link for a specific application and to explore system-level tradeoffs with various link configurations. It would be further desirable if the implemented tool preserved implementation details of the customer's channel and application as well as the confidentiality and flexibility of the provider's link design without substantially increasing the design cycle for the customer.

SUMMARY OF THE INVENTION

A system for designing a communication link for use in a data processing system, includes a parameter generator and an internal link model. The parameter generator allows a user to specify a first set of link parameters. The generator derives a set of internal parameters from the first set of parameters. The internal link model, which includes a set of configurable link cells, receives the internal parameters and instantiates each link cell based on the internal parameters. The system further includes a channel simulator or similar means for modeling a bit error rate (BER) of the instantiated communication link and may further include an estimator of the link's area and power consumption.

In an embodiment that protects the intellectual property associated with the internal model from the system user, the parameter generator prevents the user from directly accessing the internal parameters and the generic link model. The first set of parameters, those exposed or provided to the customer, are abstract link design parameters such as a sampling complexity parameter, a loop bandwidth parameter, and a loop order parameter. The cells in the internal link model include a sampling unit cell having a configurable sample rate and a sample memory having a configurable memory size. The internal link model may further include an edge detector, a phase controller, and a phase rotator, each having at least one configurable parameter. In one embodiment, the power supply voltage is also a configurable parameter of the internal link model. In one mode of operation, the system permits the user to specify a first operational parameter and an acceptable limit for a second operational parameter. The system then optimizes the link design for the first operational parameter constrained by the second operational parameter. A user, for example, could specify maximum power consumption and optimize the design for the best possible BER.

BRIEF DESCRIPTION OF THE DRAWINGS

Other objects and advantages of the invention will become apparent upon reading the following detailed description and upon reference to the accompanying drawings in which.

Figure 1:
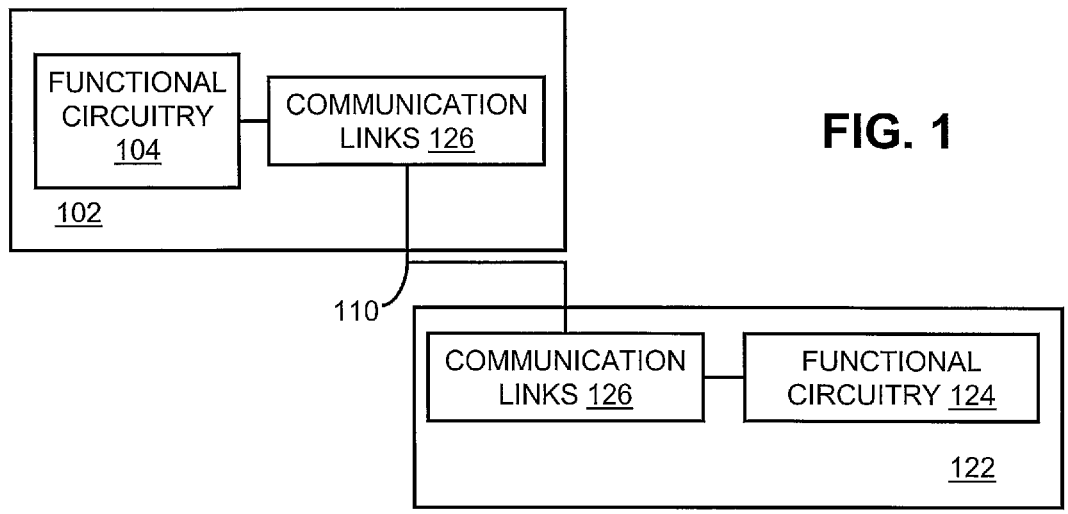
FIG. 1 is a block diagram of an embodiment of a data processing system according to the present invention including a communication link and an inter-device communication channel.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the invention contemplates a system and method for designing a communication link that is optimized for a given customer's communication channel and application. The invention enables the customer to evaluate various designs without revealing unnecessary detail regarding the link's internal design to the customer and without revealing unnecessary detail regarding the customer's application to the provider. The provider develops a canonical model of a communication link. The canonical model includes a generic set of model blocks. Each of the generic blocks is "parameterized" so that an external user can alter one or more characteristics of each block. An internal generator provides a translation mechanism between a set of system level parameters that a customer may manipulate and a set of internal link parameters that determine the configuration of the implemented link. By modifying the system level parameters, the customer is able to investigate tradeoffs and evaluate the performance of the link in a specific application environment. The internal parameter generator hides the implementation specific details of the link itself from the customer. The reduction of the link to its generic or canonical form facilitates a configurable design that can be modified and produced in silicon in a relatively short time frame. It also allows the provider to efficiently and precisely satisfy a variety of customers with diverse requirements and optimization goals, as opposed to providing a "one-size-fits-all" design to every customer.

The customer can operate the system in various modes of operation. In a design support configuration, for example, the customer can vary one or more of the system level parameters and observe the effect of performance characteristics including power, size, and Bit-Error-Rate (BER). In an automated optimization configuration, the user specifies a set of requirements in the form of one or more operational parameters such as maximum power dissipation, and a second set of parameters or optimization criteria, such as BER, and the system determines a link configuration compliant with the requirements and having an optimal value given the optimization criteria (for example, the system will find the link that has the best BER while consuming less that the maximum power consumption).

Before describing elements of the system and method for optimizing a communication link design according to the present invention, a brief description of a communication link and the environment or application in which it is embedded is presented. Referring to FIG. 1, selected elements of a data processing system 100 according to one embodiment of the present invention are depicted. In the depicted embodiment, system 100 includes a first device 102, a second device 122, and a communication channel 110 connecting the devices together. First and second devices 102 and 122 may be implemented as substantially any digital electronic device. First device 102, for example, may be a general purpose microprocessor while second device 122 represents a system memory. Alternatively, devices 102 and 122 may both represent application specific integrated circuits (ASIC's). In the most likely embodiments contemplated, first and second devices 102 and 122 are distinct devices in the sense that they are formed on separate substrates and packaged in different packages. In most embodiments, first and second devices 102 and 122 operate off of different clock generators. Communication link 110 is typically a serial link that may be implemented as a back plane interconnect, a printed circuit board wire, an optical fiber, or any of various other physical media suitable for high speed (in excess of 1 Mb/sec, and most often in the Gb/sec range) data communication.

For the purpose of emphasizing inter-device communication, first device 102 is shown as comprised of functional circuitry 104 and a communication link 106 while second device 122 is shown as including functional circuitry 124 and a communication link 126. The present invention embodies virtually any implementation of functional circuits 104 and 124 whether they represent a general purpose processor, a peripheral device controller, a memory array, an ASIC, and so forth.

Communication links 106 and 126 comprise the circuitry each device employs to send and receive information at high data rates across data channel 110. In one embodiment, links 106 and 126 have substantially similar or analogous designs. For purposes of simplicity, some features of the invention are described herein with reference to only one of the links 106 and 126. It will be appreciated, however, that each of the links may include the features or circuits of the other.

Figure 2:
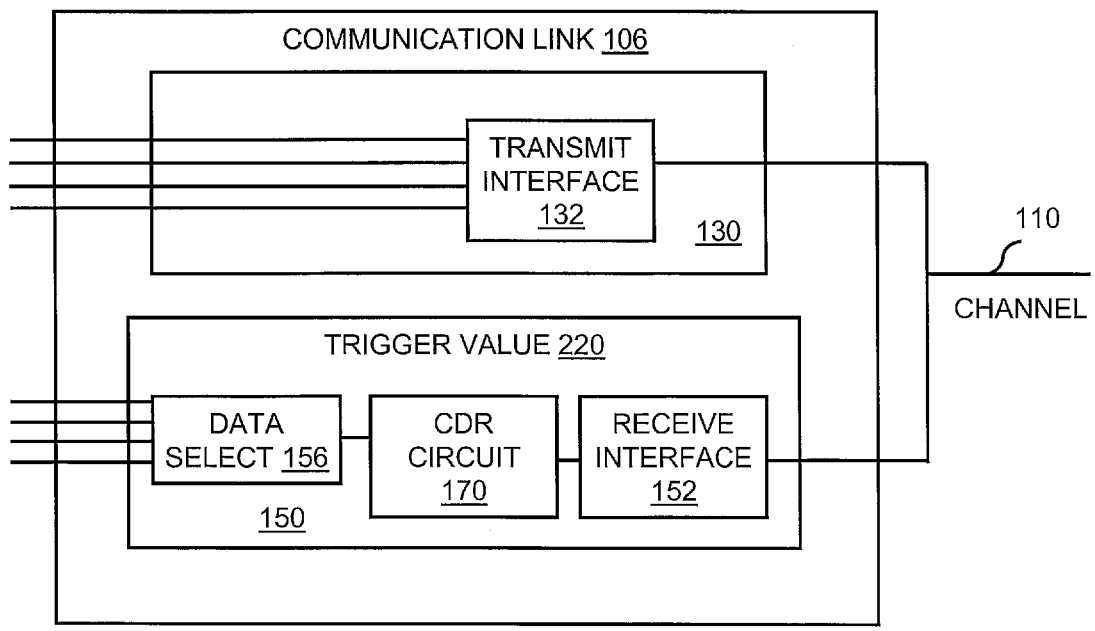
FIG. 2 is a block diagram of selected elements of a communication link of FIG. 1 according to one embodiment of the present invention.

Referring now to FIG. 2, a block diagram illustrating selected elements of communication link 106 is shown. In the depicted embodiment, communication link 106 is a transceiver that includes a transmitter 130 and a receiver 150. Transmitter 130 includes a transmit interface 132 that converts received data to serial data suitable for transmission over channel 110. Data received by transmitter 130 is typically parallel, digital data having CMOS voltage levels. In such a case, transmit interface 132 converts the parallel data to serial data and typically converts the CMOS voltage levels to voltage levels and logic formatting suitable for transmission over transmission channel 110. In one embodiment of particularly widespread application in high speed serial links, transmit interface 132 generates serial data in a non-return to zero (NRZ) format desirable for its lower bandwidth requirements. In addition, the transmit-side clock signal is implicitly embedded with the data produced by transmit interface 132 to conserve the number of interconnects required.

As depicted in FIG. 2, receiver 150 includes a receive interface 152, clock/data recovery (CDR) circuit 170, and a data select circuit 156. Receive interface 152 is responsible for recognizing the data format (e.g., NRZ) of the signal on transmission channel 110 and converting the signal to conventional (e.g., CMOS) voltage levels. CDR circuit 170 is typically a phase lock loop (PLL)-based circuit that recovers and segregates the clock and data signals, which typically appear as a single signal on transmission channel 110. Data select circuit 156 extracts the data from the output of CDR circuit 170 and readies or buffers the data for output to conventional digital logic circuits.

Figure 3:
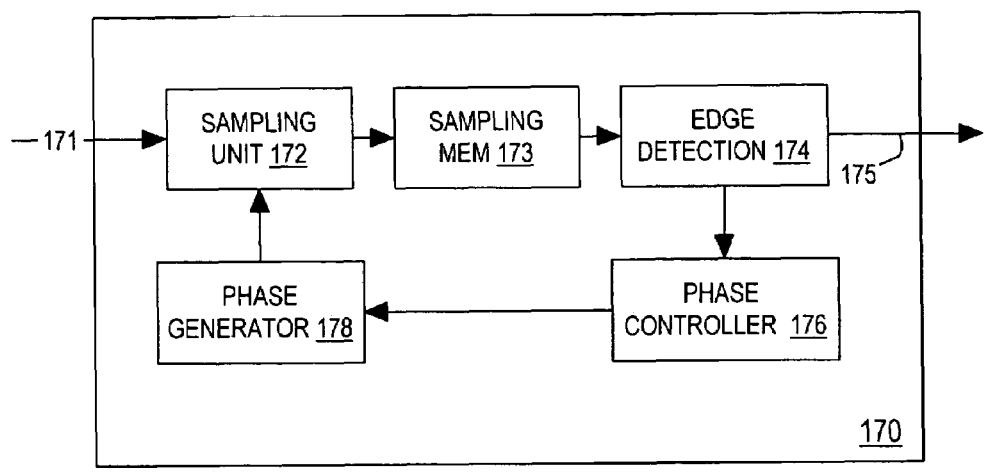
FIG. 3 is a block diagram showing additional detail of components of the communication link of FIG. 2.

Referring now to FIG. 3, additional detail of CDR circuit 170 is illustrated. In the embodiment depicted in FIG. 3, CDR circuit 170 includes sampling latches 172 and sample memory 173 that receive and sample the incoming serial signal 171 from receive interface 152 (of FIG. 2). The sampled data is provided to an edge detector 174. Edge detector 174 (also referred to as a phase detector) determines the placement (in time) of signal transitions. Edge detector 174 produces an output 175 that is indicative of the short-term phase error of the incoming signal. If a signal transition occurs later than its expected transition, for example, edge detector 174 produces an output that is indicative of the edge's actual placement relative to its expected placement. This output is also an indicator of how far the sampling clocks are from the center of the "eye" of the input serial data signal. The phase error output of edge detector 174 is received by a phase rotator controller 176. Phase rotator controller 176, in conjunction with phase rotator generator 178, monitors the phase error at edge detector 174 and attempts to compensate for at least a portion of the phase error by modifying the clocking of sampling latches 172.

The invention may be implemented as a tool that is provided to a customer to enable the customer to evaluate various communication link designs. In such embodiments, portions of the invention may be implemented as a set or sequence of computer executable instructions (software) stored on a computer readable medium such as disk storage or the like. In other embodiment, the invention includes the actual communication link or a set of generic link block models that are used in conjunction with the link's design.

Figure 4:
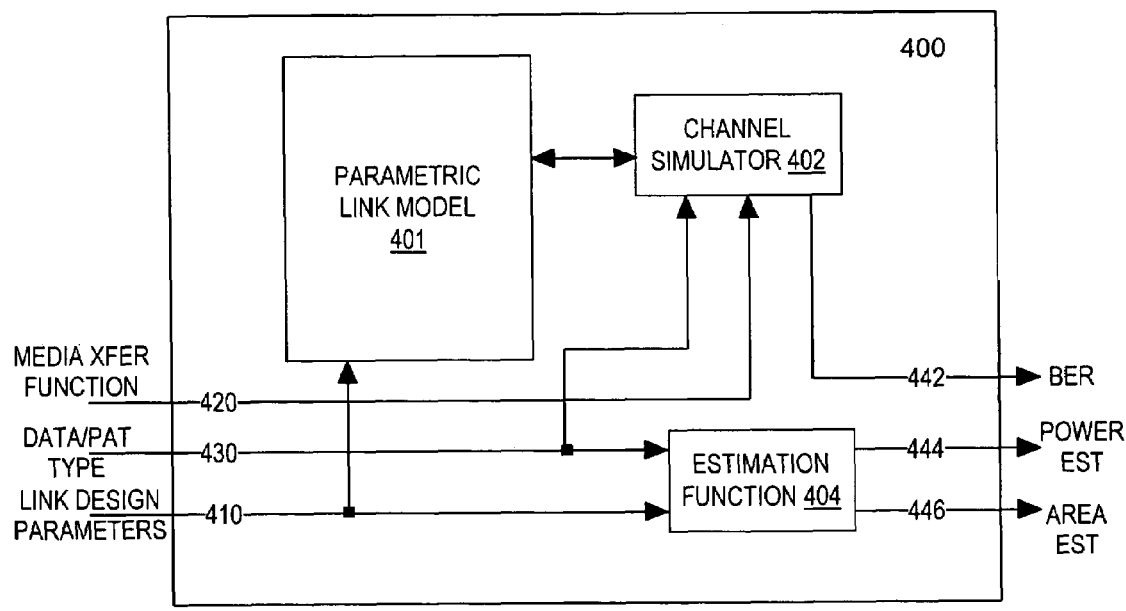
FIG. 4 is a conceptual representation of a system for designing and evaluating communication link designs.

Turning now to FIG. 4, selected elements of a system 400 for designing and optimizing a communication link, such as a link 106 of FIG. 2, for a customer's specific application are depicted according to one embodiment of the present invention. In the depicted embodiment, system 400 includes a parametric link model 401, a channel simulator 402, and an estimation function unit 404. Parametric link model 401 is a customer-configurable model of a communication link. The specific configuration taken on by parametric link model 401 is determined when the customer or other user of system 400 specifies a set of system level link design parameters. Channel simulator 402 is coupled to parametric link model 401 and provides a means for simulating the customer's channel to model a simulated bit error rate (BER) of the link and application. Estimation function unit 404 determines estimated values of power consumption and area based on the link design parameters specified by the customer and, in some cases, based on the customer's data pattern.

Parametric link model 401 is configured to receive a set of values corresponding to a set of link design parameters 410. Link design parameters 410 represent customer-alterable, system-level parameters associated with a communication link. System 400 exposes link design parameters 410 to the customer to enable the customer to experiment with different configurations by specifying various permutations of high-level parameters. As described further below, the link design parameters 410 are converted to internal link parameters within parameterized link model 401. The internal link/parameters specify particular implementations of generic link communication cells or blocks within link model 401. These internal link parameters and the generic cells of link model 401 are hidden from the customer to maintain the confidentiality of the link provider's design.

In addition to the link design parameters 410, the depicted embodiment of system 400 permits the customer to specify environmental parameters such as a media transfer function 420 and a data pattern type 430. The media transfer function 420 is a frequency response function that indicates how the channel will behave under the stress of certain signals of a certain frequency. The data pattern indicates the data being applied to the link model. The media transfer function is provided to the channel simulator 402 to produce a reliable estimate of the application's BER. Channel simulator 402 models the customer's channel based, at least in part, on the media transfer function 420 specified by the customer. The data pattern type 430 is also provided to the channel simulator and, in some cases, to estimation function 404.

Figure 5:
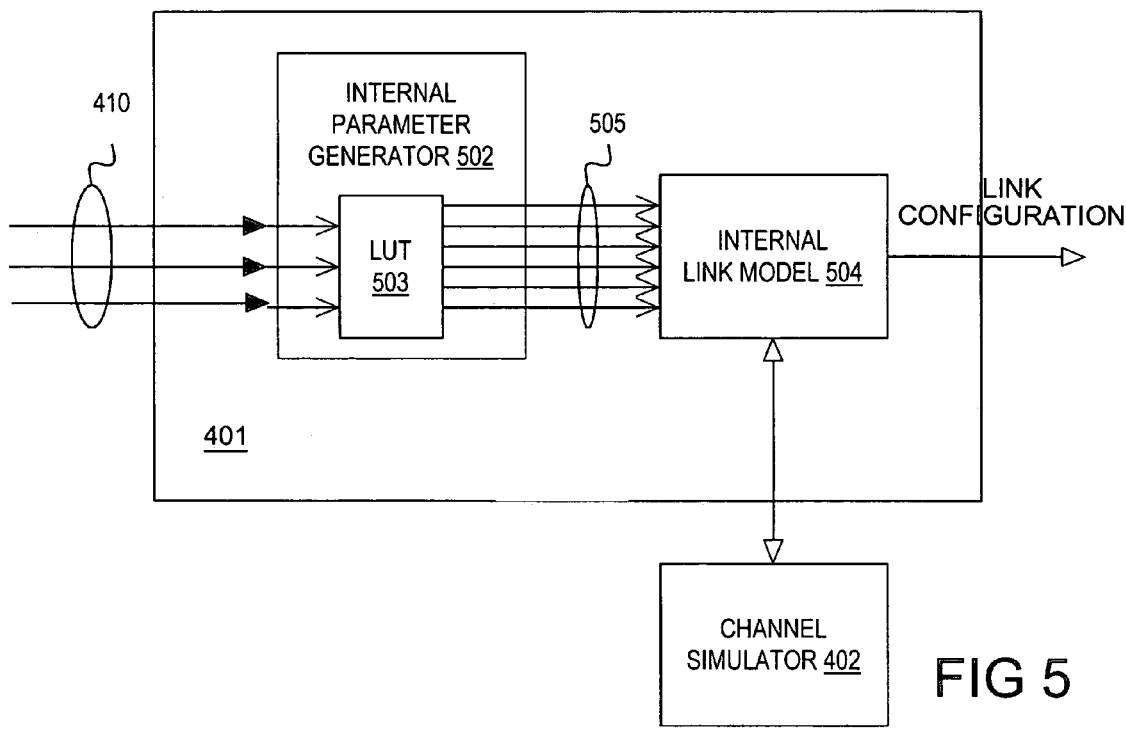
FIG. 5 illustrates additional detail of a parameterized link model of the system of FIG. 4.

Parametric link model 401 receives a set 410 of high-level link design parameter values specified by the customer. In one embodiment, link model 401 converts the customer-specified link design parameter values to a typically larger set of internal link parameters that are used to configure the actual link model. In one embodiment, the conversion of the set 410 of link design parameters to a set of internal link parameters is achieved using a look up table (LUT)-based parameter generator. Referring now to FIG. 5, additional detail of an embodiment of parameter link model 401 is depicted. In the depicted embodiment, parametric link model 401 includes an internal parameter generator 502 connected to an internal link model 504. Internal parameter generator 502 produces a set 505 of internal link parameter values from the link design parameter values 410 supplied by the customer. The internal link parameters are then provided to internal link model 504.

In the depicted embodiment, internal parameter generator 502 is implemented with a lookup table (LUT) 503. As its name implies, LUT 503 includes a set of entries where each entity represents a particular set of link design parameters 410 and a corresponding set of internal link parameters 505.

Figure 7:
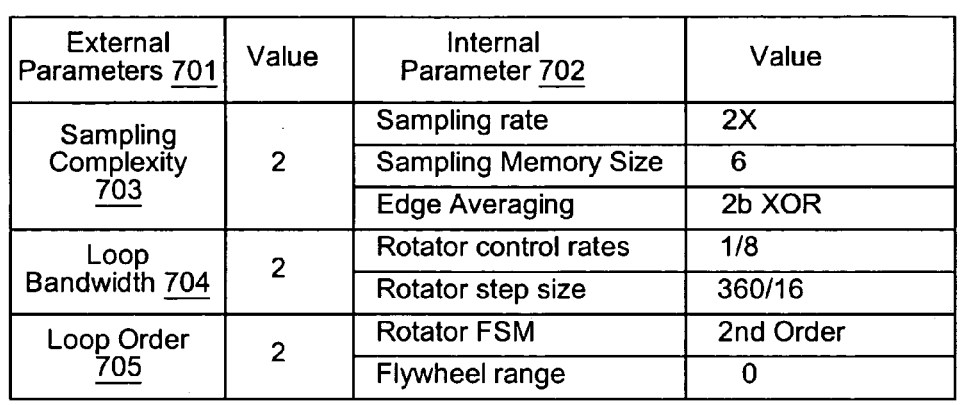
FIG. 7 is an exemplary translation table for converting externally supplied link parameters to internal link parameters suitable for defining the configuration of an internal link model.

Referring now to FIG. 7, an exemplary implementation of LUT 503 is depicted. In the depicted embodiment, LUT 503 accepts a set of three link design or external parameters 701 and converts or translates each of the link design parameters to a corresponding set of one or more internal link parameters 702. In this exemplary description, the link design parameters represent characteristics of the receive side of the link, which is typically significantly more complex than the transmit side. In other embodiments, however, the link design parameters may include other parameters including transmit side parameters. In LUT 503 as shown in FIG. 7, the link design parameters, which are exposed to the customer, include a sampling complexity parameter 703, a loop bandwidth parameter 704, and a loop order parameter 705. Each of these three link design parameters is constrained to assume one of a limited number of values. The user is able to specify each of the link design parameter values within the defined and limited set of values. A user may be able, for example, to select from one of three or more sampling complexities. The internal parameter generator 502 accepts each of the specified link design parameters and accesses LUT 503, to produce a corresponding set of internal link parameters 702 that are then provided to configure internal link model 504. As depicted in FIG. 7, each of the set of link design parameters 701 may be independent of the other so that, as shown in FIG. 7 for example, the link design parameter "sampling complexity" determines the values of internal link design parameters including a sample rate parameter, a sampling memory size, and an edge averaging technique whereas the value of link design parameter "loop bandwidth" defines internal settings including rotator control rates and rotator step sizes while a "loop order" link design parameter controls internal parameters shown as rotator FSM type and flywheel range. Internal link model 504 derives a specific link implementation by implementing the link according to the internal link parameter values. In the depicted embodiment of LUT 503, for example, the customer/user has specified a sampling complexity of 2. Based on this customer-specified value of a high level parameter, internal parameter generator 502 and LUT 503 produce values for sampling rate, sampling memory size, and edge averaging technique. Each of the internal link parameters is preferably configurable across a relatively small set of values. If each internal link parameter is limited to three or fewer values, the state space of possible implementations of internal link model 504 is greatly reduced.

As depicted in FIG. 7, the loop bandwidth design parameter and the loop order design parameter each map into a corresponding pair of internal link parameters, namely, a rotator control rate and a rotator step size for the loop bandwidth parameter and a rotator finite state machine (FSM) parameter and a flywheel range parameter for the loop order link design parameter.

The rotator control rate parameter and the rotator step size parameter determine whether phase changes within a certain bandwidth can be tracked by the loop and how much jitter within a certain bandwidth will be filtered by that loop. Specifically, the "rotator control rate" parameter determines how fast the rotator control machine runs. Therefore, it is a factor in the overall ability to keep up with long-term phase changes of a certain frequency or bandwidth. The "rotator step size" parameter determines the size of each step in internal phase movements. The bigger the step the faster the loop can change the phase of the sampling clocks, and thus the faster it can react to phase movements of the input serial data. The trade-off is that larger steps can increase so-called algorithmic jitter.

Similarly, the rotator FSM type and flywheel range parameters affect the "order" of the loop, since they affect the order of the filtering functions implemented by the flywheel and rotator state machine blocks. (The block referred to as "flywheel" here is an extra filtering block typically used to increase the ability of the rotator machine to track fast long-term frequency changes.)

The internal link parameters 505 are provided to and used by internal link model 504 to instantiate or configure the set of cells in the actual circuit based on link parameters 505. The mapping depicted in FIG. 7 is fairly simplistic in that each design link design parameter 410 corresponds to an independent set of internal link parameters. In other embodiments, the internal link parameters are each dependent on each other such that, for example, each link design parameter maps to the entire set of internal link parameters.

Figure 6:
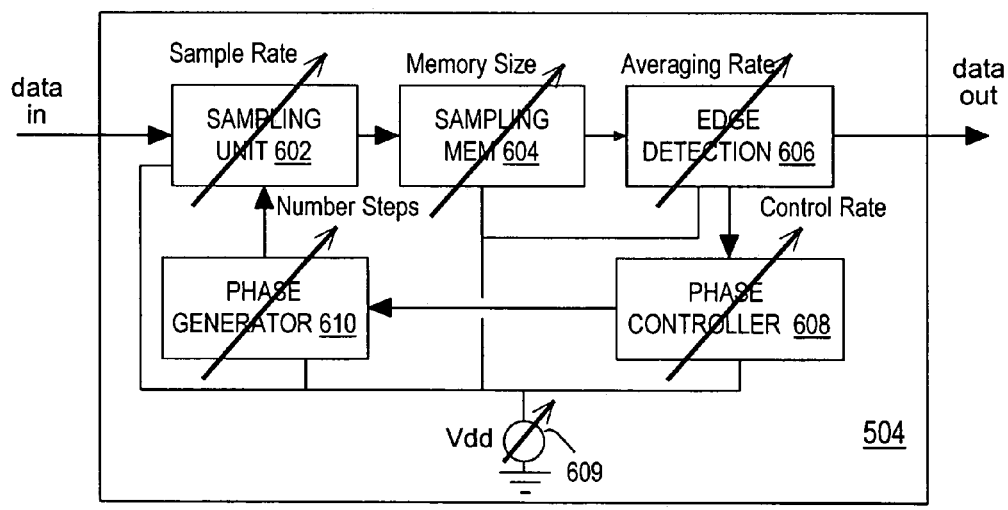
FIG. 6 illustrates additional detail of an internal link model of the parameterized link model of FIG. 5.

Referring to FIG. 6, an exemplary implementation of internal link model 504 is depicted. Internal link model 504 is a communication link model comprised of a set of configurable communication link cells or blocks that represent the major components of the link receiver. In the depicted embodiment, these cells include sampling unit 602, sample memory 604, edge detection unit 606, phase controller 608, and phase generator 610 all of which may be familiar to those skilled in the design of high speed communication links and CDR circuits. Cells 602 through 610 correspond functionally to the elements 172 through 178 of CDR circuit 170 as depicted in FIG. 3.

In the embodiment of internal link model 504 depicted in FIG. 6 each of the cells 602 through 610 is configurable or "parameterized" (as indicated by the arrows through each cell). As used herein, a parameterized cell is a cell capable of being implemented in one of a discrete and typically relatively small number of configurations. Thus, each parameterized cell 602 through 610 is capable of being of being implemented, in the final application, with one of several configuration options. The configurable setting of sampling unit 602, as an example, represents the amount of over-sampling performed. Sampling unit 602 may be implemented to sample 2, 3, or even 4 data points per unit or bit interval. In this example, the sampling rate is the parameterized characteristic and the values 2, 3, and 4 represent the finite set of values that the cell may have. The configurable nature of cells 602 through 610 is conveyed in FIG. 6 by the diagonal arrows of each configurable cell. In addition to the parameterized elements 602 through 610 shown in FIG. 6, the depicted embodiment of internal link model 504 includes a Vdd voltage supply that is also configurable either from the user directly or, in another implementation, through internal parameter generator 502. The ability to manipulate the Vdd voltage supply in conjunction with modifications of other cells in the design greatly benefits the system designer in finding low power consumption implementation of their applications.

As depicted in FIG. 6, internal link 504 has a set of five parameterized elements (i.e., elements 602 through 610) and a variable or parameterized Vdd supply. In this case, internal parameter generator 502 is designed to produce a set 505 of six internal link parameter values, which are provided to internal link model 504. In an embodiment of internal parameter generator 502 that includes LUT 503, each entry in LUT 503 would typically indicate a value for each of the set 505 of six internal link parameters.

Returning now to FIG. 4 and FIG. 5, after the internal link 504 is configured via user specification of link design parameters 410 and the resulting conversion to internal parameters by parameter generator 502 and LUT 503, channel simulator 402 of system 400 is provided with details of the implemented link from link model 401, data and pattern type information 430, and the media transfer function 420, channel simulator 402 produces a simulated BER 442. In addition, the link design parameters 410 and the data pattern 430 are provided to estimation function 404 to generate an expected value for power consumption and area of an integrated circuit device corresponding to internal link model 504.

In an embodiment that emphasizes preserving the details of the implemented communication link from the customer while also enabling the customer to preserve details of its application from the link's provider or designer, the internal elements of system 400 are not accessible to the customer. Instead, system 400 exposes a limited set of high-level parameters to the customer. While the customer is able to manipulate these parameters and observe the resulting effect on the link's performance characteristics, the customer is prevented from accessing (and has no need to access) the internal elements of system 400. The confidentiality of the system's internal components is especially true for parametric link model 401. Whereas the details of the channel simulator and area estimator may not be highly proprietary (except to the extent that those details reveal information about the generic communication link model), the details of parametric link model are likely to be highly proprietary. System 400 enables both parties to respect the limits of the other's confidential information by providing a tool that a customer can use to optimize a link using a set 410 of high level parameters that does not reveal implementation details of either the communication link itself or the specific application into which the link will be located.

The invention contemplates at least two modes of operation. In the first mode of operation as described above, the customer or user manipulates, perhaps using a graphical user interface, link design parameters 410 and observes the effects on BER 442, power consumption 444, and area 446. This mode provides and intuitive tool for system level designers and frees the designer from having to understand intricacies associated with the link design. In another operational mode, referred to as the optimization mode, the user specifies a first operational parameter (e.g., the maximum acceptable BER) and then invokes system 400 to optimize one or more other operational parameters (e.g., power consumption and/or die size area). System 400 may achieved optimization of the link in this case by simulating every possible permutation of the internal link parameters and selecting the permutation producing the most desirable results consistent with the user's specified limitations. If the number of internal link parameters is not too extensive and each parameter is limited in the number of values it can assume, the full enumeration technique might well be acceptably efficient. Otherwise, an optimization algorithm may be used. In another embodiment, the system makes an educated guess about the optimum solution for a given constraint based on pre-existing characterization of the link. In either embodiment, the optimization mode is a powerful design tool that enables a system level designer to derive a communication link that is optimal for the application.

It will be apparent to those skilled in the art having the benefit of this disclosure that the present invention contemplates a mechanism for evaluating or optimizing the design of a high speed communication link. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of providing a service permitting a user to define a communication link suitable for use in a data processing system, said method comprising:

defining an internal model of a generic communication link, the internal model comprising a set of configurable link cells;

enabling the user to specify a first set of parameters associated with the communication link while preventing the user from accessing the internal model;

providing means for converting the first set of parameters to an internal set of parameters; and providing means for using the internal parameters to configure the internal model of the communication link.

2. The method of providing a service of claim 1, wherein:

enabling the user to specify a first set of parameters includes enabling the user to specify a first operational parameter and a second operational parameter;

providing means for using the internal parameters to configure the internal model includes providing means for configuring the internal model to obtain an optimal value for the first operational parameter constrained by the second operational parameter.

3. The method of providing a service of claim 1, further comprising providing means for simulating a bit error rate of the communication link.

4. The method of providing a service of claim 3, further comprising providing means for estimating die size and power consumption of the communication link.

* * * * *